UnitedStates Patent [19]

Lindsley et al.

[11] Patent Number: 4,652,545
[45] Date of Patent: Mar. 24, 1987

[54] CATALYST FOR HYDROCONVERSION OF HEAVY OILS AND METHOD OF MAKING THE CATALYST

[75] Inventors: John F. Lindsley, Stamford, Conn.; Marvin S. Goldstein, Pikesville, Md.; William H. Quayle, Shelton, Conn.

[73] Assignee: American Cyanamid Company, Stamford, Conn.

[21] Appl. No.: 730,619

[22] Filed: May 6, 1985

[51] Int. Cl.$^4$ .......................... B01J 21/12; B01J 23/88
[52] U.S. Cl. ............................... 502/255; 208/216 PP
[58] Field of Search ....................... 502/255, 314, 315; 208/216 PP

[56] References Cited

U.S. PATENT DOCUMENTS 3,383,301 5/1968 Beuther et al. ............... 208/216 PP
3,509,044 4/1970 Adams et al. .................. 502/254 X
4,048,060 9/1977 Riley ............................ 208/216 PP Primary Examiner—W. J. Shine
Attorney, Agent, or Firm—Gordon L. Hart

[57] ABSTRACT

Catalysts for hydroconversion of heavy oils, particularly those containing Ramsbottom carbon precursors, comprise nickel or cobalt and molybdenum on porous alumina containing 1–3% silica. The catalysts have total pore volume of 0.5 to 1.5 ml/gm with at least 70% of the pore volume in pores of 40–60Å pore radius and with only about 10–35% of the nickel or cobalt in acid extractable form.

2 Claims, No Drawings

CATALYST FOR HYDROCONVERSION OF HEAVY OILS AND METHOD OF MAKING THE CATALYST

The invention relates to improved catalysts for the hydroconversion of heavy oils and particularly those which contain Ramsbottom carbon precursors. These precursors include asphaltenes which can be converted to distillate oils but which also can thermally decompose to coke during distillation or in downstream operations. Heavy oils which contain Ramsbottom carbon precursors include, atmospheric and vacuum reduced crude petroleum, tar sand extracts, shale oil, products from coal liquefaction, raffinates from solvent deasphalting and heavy crude oils such as Venezuelan Orinoco and Mexican Maya. As the world's petroleum reserves are depleted, it becomes important not to lose as coke the 2–50% of Ramsbottom carbon precursors present in the heavy oils. Process conditions for the catalytic hydroconversion of these oils to lighter distillates are necessarily so severe that a high degree of hydrodesulfurization (HDS), hydrodenitrogenation (HDN) and hydrodemetallation (HDM) also occurs The catalyst of this invention comprises nickel or cobalt and molybdenum on an alumina support and has a specific narrow pore size distribution. Both the pore size distribution and the chemical state of the supported nickel or cobalt component in the catalyst are important to the purpose of the invention which is to catalytically convert an increased proportion of the Ramsbottom carbon precursors to distillates while reducing the loss to coke.

Catalytic hydroprocessing of heavy oils falls into two major classes of processes. Of the first class are those processes designed for hydrodesulfurization, hydrodenitrogenation and hydrodemetallation. Most of these processes use a catalyst consisting of nickel or cobalt with molybdenum on alumina. Such processes usually provide little if any hydroconversion of the Ramsbottom Carbon precursors to distillate oils. The second class of processes are those designed for hydroconversion which includes hydrogenation and hydrocracking. Most of these processes use catalysts that contain a strongly acidic material such as an ion-exchanged zeolite or a fluoride ion. Many hydrocracking processes have two stages, each stage using a different catalyst. The first stage uses an HDS-HDN type of catalyst and the second stage uses a hydroconversion type of catalyst. It is unusual in the prior art to find significant hydroconversion in processes using an HDS-HDN type catalyst which has no strong-acid function.

The use of catalysts of narrow pore size distribution for HDS or HDN is known. Prior art was reviewed in U.S. Pat. No. 4,069,139, which itself described and claimed catalysts having a narrow pore size distribution similar to, but of larger pore size than, the hydroconversion catalysts of the present invention. However, none of the prior art described catalysts having both the narrow pore size distribution and the low proportion of acid-extractable nickel as in catalysts of the present invention.

One kind of commercial process for hydroconversion of heavy oils employs catalysts that do not have the usual strong acid sites found on most catalysts for hydroconversion of distillate oils. This process is known as the ebullated bed process. Specific ebullated bed processes are the H-Oil Process developed by Hydrocarbon Research Inc., Trenton, N.J. and the LC-Fining Process developed by Lummus Engineering Co. of Bloomfield, N.J.

Originally the ebullated bed processes were aimed at HDM and HDS refining of heavy oils. In the case of HDM, as described in U.S. Pat. No. 2,987,470, any inert solids of small particle size, e.g. sand, would suffice as catalyst, the requirement being that it could form an ebullated bed of the small particles in the reactor. In the case of HDS, as described in U.S. Pat. No. 2,987,467, any HDS-HDN type of catalyst was said to be satisfactory provided that it would form an ebullated bed. The catalysts of the invention are suitable for use in processes using either ebullated bed reactors or fixed bed reactors.

As more effective catalysts were developed, higher degrees of hydroconversion and HDS became achievable. A second generation of such catalysts was based on the concept of macropores to provide access of heavy oils to the micropores which contain the catalytically active sites. Examples of specified macropore volumes in the prior art descriptions are 10–40% of the pore volume in pores greater than 1000Å diameter, as described in U.S. Pat. No. 3,630,888 or 0.1 to 0.6 cc/g in pores with diameter greater than 250Å as described in U.S. Pat. No. 3,622,500. There was no mention of any need for a narrow pore size distribution in pores having diameter smaller than 250Å. There was also no description of a way to reduce the catalyst deactivation rate by decreasing the amount of acid extractable Ni/Co in the catalysts.

The invention provides improved catalysts for the hydroconversion of heavy oils which contain Ramsbottom Carbon precursors in concentrations from about 2% to about 50% by wt of the oil. One important feature of the invention is the narrow pore size distribution in the catalyst. The porosity properties of a catalyst embodying the invention can be defined as follows:
1. Total Pore Volume: 0.5 to 1.5 ml/g
2. Pore Volume in pores of 40–60Å pore radius: at least 70% of Total Pore Volume
3. Pore Volume in pores of less than 40Å pore radius: not more than 0.03 ml/g
4. Pore Volume in pores of greater than 60Å pore radius: 0.05 to 0.10 ml/g.

Pore radius for the above definitions are measured by the nitrogen desorption cycle of the nitrogen sorption isotherm at 77.4° K. using an instrument such as the Aminco Adsorptomat manufactured by the American Instrument Co., Maryland or the Autosorb-6 manufactured by the Quantochrome Corp., Syosset, N.Y. The mathematical analysis of the isotherm used to obtain pore size distribution is that of Barrett, Joyner and Halenda (Journ. Am. Chem. Soc., 73, 373, 1951). Nitrogen thickness values used in the calculation are obtained using the method of Shull (Journ. Am. Chem. Soc., 70, 1410, 1948). Median pore radius is defined as that pore radius from which 50% of the total nitrogen pore volume is in smaller pores and 50% is in larger pores.

The catalyst of this invention contains nickel or cobalt and molybdenum on a porous alumina support. The alumina support may contain in addition to alumina minor amounts of other inorganic oxides such as titania, zirconia, silica, phosphorous and the like. Using conventional procedures, the catalytic metals are deposited on the support. First the molybdenum is deposited, for example as an aqueous ammonium heptamolybdate solution by the pore saturation procedure. Then the product may be dried and calcined to decompose the ammonium molybdate to MoO₃. After cooling, the extrudates may be impregnated with a solution of nickel or cobalt nitrate and again dried and calcined to decompose the metal nitrate to CoO or NiO. Alternatively, the catalytic metals may be impregnated all in a single solution. The temperature of the final calcination after impregnation is found to determine the ratio of free Ni/Co to combined Ni/Co in the catalyst. The free nickel or cobalt oxide, which is acid extractable, is believed to be loosely associated with the small particles of MoO₃ present. Combined nickel or cobalt is not readily acid-extractable and is believed to be combined by reaction with the support to form aluminates called spinels which are believed to be catalytically inactive. These concepts are clearly described in the article by Bachelier et al in the Journal of Catalysis 87 pp. 292-304 (1984). To maximize HDS catalytic activity one should maximize the proportion of acid extractable Ni/Co. As Bachelier points out, this is done by keeping the final calcining temperature well below 1000° F. in the case of nickel.

We have found, surprisingly, that for hydroconversion of heavy oils, a lower proportion of acid extractable Ni/Co to the total Ni/Co content is desirable, preferably only about 10-35% by weight of the Ni or Co is extractable, more preferably about 15-30% and most preferably from 20-28%. In the case of nickel, the final catalyst calcination temperature must be above 1000° F. to reduce the proportion of extractable nickel to a value in this range. Cobalt reacts more slowly with alumina necessitating even higher calcination temperatures to reduce the proportion of acid extractable cobalt to a value in the desired range.

We suppose that the combination of the defined narrow pore size distribution and the low proportion of acid extractable Co/Ni prevents the catalyst from being deactivated almost immediately with respect to its hydroconversion activity. Both of these properties of the catalyst are necessary for preventing such immediate deactivation. That would explain the surprisingly improved combination of high catalytic hydroconversion activity and slower catalytic deactivation rate observed when the catalyst is tested.

The requirement for the defined pore size results from compromise between opposing considerations.

The pores cannot be primarily in the range of 50-90Å diameter as taught by Adams et al (U.S. Pat. No. 3,509,044) and by Gustafson (U.S. Pat. No. 3,966,644) because such small pores did not provide easy access for asphaltenes and other large molecules.

If the pores were mostly above about 120Å diameter as taught by Riley (U.S. Pat. No. 4,069,139) by Scott et al (Advances in Chemistry Series 103, page 117, ACS 1971) and others, then the surface area of the catalyst and correspondingly its activity would be too low.

Hydrogen transfer activity probably occurs in pore spaces in the vicinity of surface sites containing nickel or cobalt. Depending upon the availability of hydrogen in those pore spaces, the predominating reactions will be either hydrogenation or dehydrogenation.

When the catalyst has been calcined at an appropriately high temperature (sufficient to reduce the extractable Co/Ni to the specified range) the hydrogen transfer activity of the catalyst is reduced. With reduced hydrogen-transfer reactivity, it is easier for the hydrogen supply to keep up with the rate of hydrogen consumption and hydrogenation predominates over dehydrogenation.

In the opposite case, using catalysts where the hydrogen-transfer reactivity is too high, the transport rate for supplying hydrogen to the active sites cannot keep up with the hydrogen-transfer reaction rates at those sites; then dehydrogenation predominates, coke forms and the catalyst is deactivated.

DESCRIPTION OF SPECIFIC EMBODIMENTS

Catalysts having the narrow pore size distribution specified above and containing 0.5-5% NiO or CoO and 1.8%-18% of MoO₃ are prepared as described in the following detailed examples. To monitor the ratio of "free" to "combined" Co or Ni we have developed the following analysis.

ANALYSIS FOR ACID EXTRACTABLE CO/NI

Dilute 10 ml of c.p. conc. HCl with 400 ml of distilled water to prepare a stock solution of dilute (ca. 0.9%) HCl. Place a 10 gram sample of the catalyst to be tested and 20 ml of the dilute HCl in a 2 oz. bottle. Keep the sealed bottle in motion for one hour in a shaking or rolling apparatus. Filter the catalyst and wash with three 25 ml portions of distilled water. Weigh the combined filtrate plus washings and analyze the solution for Ni or Co. Knowing the nickel or cobalt content of the original catalyst sample, one can readily calculate the percentage that was extracted by the dilute HCl solution.

A number of commercial nickel-containing HDS catalysts were analyzed using the above analysis. Nickel content varied from about 3 to about 5% and extractable nickel varied from about ⅓ to about ¾ of the total nickel.

For catalysts containing about 3% NiO or CoO and about 15% MoO₃ on alumina, the percent extractable nickel or cobalt correlates inversely with calcination temperatures. Results in Table 1 illustrate the correlation.

TABLE 1

| NiMo Catalysts | | CoMo Catalysts | |
| --- | --- | --- | --- |
| Final Calcining T °F. | % Ni Extractable | Final Calcining T °F. | % Co Extractable |
| 950 | 52.8 | 888 | 60.9 |
| 1120 | 27.0 | | |
| 1160 | 20.8 | | |
| 1210 | 15.5 | 1210 | 22.8 |

EXAMPLE 1

A catalyst support was prepared which had an appropriate narrow pore size distribution in the range defined above. A state-of-the-art spray dried alumina-silica powder was selected for use to make the support. Other powders, for example pure alumina, alumina-boria, alumina-titania, etc can be used instead provided their micro pore volumes are sufficiently high. The pore volume of the selected alumina-silica powder was 0.76 ml/g in pores between 35 and 200Å diameter. Suitable powders can be made by procedures described in the following U.S. patents to Malley et al: U.S. Pat. Nos. 3,124,418; 3,032,514; 2,980,632; 3,086,845; and to Adams et al: 3,509,044.

25 pounds of the spray dried powder (75% solids) were mixed with 22 lb of 0.06 molar nitric acid. The composite was mixed in a muller for one hour. Then the doughy mix from the muller was extruded into 1/32″ diameter cylindrical strands. The strands were dried for one hour in an oven at 250° F.

Half of the oven dried extrudates, Sample A, were calcined at 1100° F. for one hour in an externally fired rotary calciner. The other half, Sample B, were calcined at 1300° F. for one hour in the same calciner. In making Sample B, the atmosphere over the catalyst bed in the calciner was almost totally steam, whereas in making Sample A a purge of fresh air was continuously swept through the calciner to keep the water vapor content in the atmosphere very low.

Porosity data for these supports, Samples A and B are tabulated in Table 2.

TABLE 2

| Sample | Support Sample A | Support Sample B |
|---|---|---|
| Surface Area m²/g | — | 192 |
| Pore Volume ml/g | 0.76 | 0.75 |
| Medium Pore Diameter Å | 60 | 130 |

Sample B is the support selected to make the catalyst of the invention because of its suitable median pore diameter.

EXAMPLE 2

Five pounds of Support Sample B were impregnated by pore saturation with 1620 ml of an aqueous solution containing 311 gm nickel nitrate hexahydrate and 493 gm ammonium heptamolybdate. The impregnated extrudates were transferred at ambient temperature to a rotary calciner and the material was heated to 820° F. over a period of about 1 hour and then held at 820° F. for another hour in the calciner. About half of the catalyst was discharged. This sample was marked for identification as Catalyst Sample C.

The catalyst remaining in the calciner was further heated from 820° F. to 1120° F. in about 5 minutes and held for another 10 minutes at 1120° F. The catalyst was discharged and marked for identification as Catalyst Sample D.

Measured properties for Catalyst Samples C, D and E are shown in Table 3. The Catalyst Sample D is the catalyst of the invention.

American Cyanamid HDS-1443 B is a commercially available, state-of-the-art, catalyst sold for use in hydrotreating resid oils. A sample of this catalyst (Catalyst Sample E) and Catalyst Sample D were evaluated for resid hydrotreating under the test conditions described in Example 3 below. The results of this test, tabulated in Table 4, show that the catalyst of this invention was 28 to 60% more active than the state-of-the-art catalyst, depending upon the category considered.

TABLE 3

| CATALYST PROPERTIES | | | |
|---|---|---|---|
| Sample I.D. | Catalyst Sample C | Catalyst Sample D | Catalyst Sample E* |
| Chemical Compositions, wt % | | | |
| NiO | 2.9 | 2.9 | 3.6 |
| MoO₃ | 14.6 | 14.6 | 13.2 |
| SiO₂ | 1.0 | 1.0 | 1.0 |
| Al₂O₃ | balance | balance | balance |
| Porosity | | | |
| Surface Area m²/g | 195 | 191 | 280 |
| Total Pore Volume (N₂) ml/g | 0.52 | 0.52 | 0.8 |
| Pore Volumes in Pores | | | |
| less than 40Å radius | 0.03 | 0.028 | 0.3 |

TABLE 3-continued

| CATALYST PROPERTIES | | | |
|---|---|---|---|
| Sample I.D. | Catalyst Sample C | Catalyst Sample D | Catalyst Sample E* |
| 40–60Å radius | 0.39 | 0.398 | 0.1 |
| greater than 60Å radius | 0.07 | 0.080 | 0.4 |
| Nickel Extraction, % | ≧70 | 22 | 60 |

*typical values

EXAMPLE 3

Performance tests using Catalyst Samples D and E were run using as the feedstock, Kuwait vacuum residua having the following average analysis:

| Gravity °API | 7–9 |
|---|---|
| Ramsbottom Carbon Residue | ca. 20% |
| Sulfur | ca. 5% |
| Nitrogen | ca. 4000 ppm |
| Nickel | ca. 30 ppm |
| Vanadium | ca. 100 ppm |

The following test procedure was used to evaluate the Catalysts D and E. The hydrotreating temperature for this test was higher than usual to provide some degree of thermal cracking and to increase the hydrogenation reaction rates.

A 50—50 (by volume) mixture of the catalyst to be tested and inert corundum of about the same particle size as the catalyst was charged to a fixed-bed bench-scale reactor in which the catalysts were pretreated in a nitrogen atmosphere at 600° F. to ensure dryness. Then the catalysts were converted from oxide to sulfide by contact with a gaseous mixture of 90 mole percent H₂ and 10 mole percent H₂S at 600°–700° F. for 2 hours at a pressure of 35 psig in the reactor.

Hydrogen gas and the resid feedstock were fed to the reactor under the following conditions

| Temperature | 825° F. |
|---|---|
| Liquid Hourly Space Velocity | 2.5 |
| Total Pressure | 2250 psi |

For all of the catalysts tested there was a steep initial non-linear activity decline through the first day on test. Consequently, data on hydrodesulfurization and conversion of Ramsbottom Carbon Residue were measured on the third day of the test. Those data are tabulated in Table 4.

TABLE 4

| CATALYST ACTIVITY TESTING | | |
|---|---|---|
| Catalyst | D | E |
| Operating Conditions | | |
| Temp °F. | 825 | 825 |
| LHSV, hr⁻¹ | 2.5 | 2.5 |
| Pressure, psig | 2250 | 2250 |
| Conversion, wt % | | |
| Total Sulfur | 87.3 | 72.4 |
| Ramsbottom Carbon Residue | 73.4 | 57.5 |
| Non-RCR | 84.0 | 76.0 |
| Sulfur in 975° F.+ | 93.8 | 85.9 |
| Rate Constants, hr⁻¹ | | |
| Total Sulfur | 5.15 | 3.22 |
| Ramsbottom Carbon Residues | 3.30 | 2.14 |
| Non-RCR | 4.57 | 3.57 |
| Sulfur in 975° F.+ | 6.94 | 4.89 |

We claim:

1. A catalyst composition useful in the hydroconversion of heavy oils containing 0.5–5% of nickel or cobalt and 1.8–18% molybdenum calculated as the oxides on a porous alumina support containing 1–3% silica, characterized by having 15–30% of the nickel or cobalt in an acid extractable form and further characterized by a total pore volume of 0.5–1.5 ml per gram and a pore size distribution of:

at least 70% of total pore volume in pores of 40–60Å radius, not more than 0.03 ml per g. of pore volume in pores of less than 40Å radius, at least 0.05 ml per g. and not more than 0.1 ml per g. of pores greater than 60Å radius, said pore size distribution being calculated from desorption data of the nitrogen sorption isotherm.

2. A method of making the catalyst composition defined by claim 1 comprising the steps of:

a. calcining alumina extrudates under steam to adjust the median pore size diameter to a suitable value to obtain the defined pore size distribution in the finished catalyst, b. impregnating the steamed, extrudates with molybdenum and cobalt or nickel salts in liquid solutions, and c. calcining the impregnated extrudates at temperature above 1000° F. and sufficiently high to reduce the acid extractable nickel or cobalt to the defined value in the finished catalyst.

* * * * *